United States Patent [19]

Nguyen et al.

[11] Patent Number: 5,039,549
[45] Date of Patent: Aug. 13, 1991

[54] TREATMENT OF ULTRAHIGH MOLECULAR WEIGHT POLYOLEFIN TO IMPROVE ADHESION TO A RESIN

[75] Inventors: Huy X. Nguyen, Midlothian, Va.; Anoshiravan Poursartip, Vancouver, Canada; Golnar Riahi, West Vancouver, Canada; Roger C. Bennett, Delta, Canada; Geoffrey M. Wood, Oak Ridge, Tenn.

[73] Assignee: Allied-Signal Inc., Morris Township, Morris County, N.J.

[21] Appl. No.: 614,070

[22] Filed: Nov. 14, 1990

Related U.S. Application Data

[63] Continuation of Ser. No. 422,841, Oct. 17, 1989, abandoned.

[51] Int. Cl.$^5$ .............................................. B05D 3/06
[52] U.S. Cl. ................... 427/54.1; 427/322; 427/354; 427/393.5; 428/518; 430/271; 430/537; 430/538
[58] Field of Search ............... 427/54.1, 322, 354, 427/393.5; 428/518; 430/271, 537, 538

[56] References Cited

U.S. PATENT DOCUMENTS 2,999,056  9/1961  Tanner ................................ 204/154
4,410,586  10/1983 Ladizesky et al. ................. 428/245
4,421,780  12/1983 Buzio et al. ........................ 427/40
4,600,649  7/1986  Leo ..................................... 428/412

OTHER PUBLICATIONS

Kubota, H., Koike, N., and Ogiwara, Y., "Location of Methacrylic Acid-Grafted Chains Introduced into Polyolefin Films by Means of Photografting", J. Polymer Sci., Letters Ed., 25 273, 1987.
Ogiwara, Y., Kobayashi, K., and Kubota, H., "Effect of Binary Sensitizers on Photografting of Methacrylic Acid on Low-Density Polyethylene Film", J. Polymer Sci., Polymer Letters, vol. 24, 511-517, 1986.
Tazuke, S., and Kimura, H., "Surface Photografting. I. Graft Polymerization of Hydrophilic Monomers onto Various Polymer Films", J. Polymer Sci., Polymer Letters Ed., 16, 497, 1978.
Ogiwara, V., Kanda, M., Takumi, M., and Kubota, H., "Photosensitized Grafting on Polyolefin Films in Vapor and Liquid Phases", J. Polymer Sci., Polymer Letters Ed., 19, 457, 1981.
Tazuke, S., and Kimura, H., "Modification of Polypropylene Film Surface by Graft Polymerization of Acrylamide", Makromol. Chem., 179, 2603, 1978.
Oster, G., Oster, G. K., and Moroson, H., "Ultraviolet Induced Crosslinking and Grafting of Solid High Polymers", J. Polymer Sci., 35, 671, 1959.

(List continued on next page.)

Primary Examiner—Michael Lusignan

[57] ABSTRACT

Method and apparatus for treating ultrahigh molecular weight, high strength polyolefin to improve its adhesive bonding to a resin such as epoxy, vinyl ester, polyester, polyurethane, polyolefin or thermoplastic rubber are provided. The method includes the steps of soaking the polyolefin in a first solution comprising (i) an aromatic ketone photosensitizer, and (ii) a first solvent selected from the group consisting of a benzene derivative, an alkyl halide, and a cyclic alkane; removing any excess first solvent; coating the surface of the polyolefin with a second solution comprising (i) about 15 to 70 weight percent of a monomer independently selected from the aforementioned group, (ii) about 0.25 to 5 weight percent of an aromatic ketone photosensitizer, and (iii) about 25 to 84.75 weight percent of a solvent selected from the group consisting of a low boiling point alcohol and a low boiling point ketone; exposing the coated polyolefin to a sufficient amount of irradiation to surface graft the monomer of the second solution to the polyolefin; washing the treated polyolefin; and drying for suitable packaging. The apparatus features an irradiation treatment chamber through which the polyolefin is passed in a cooled tube for treatment.

22 Claims, 1 Drawing Sheet

OTHER PUBLICATIONS

Angier, D. J. in "Chemical Reactions of Polymers", Interscience Publishers, New York, 19, p. 1028.

Kubota et al., "Vapor Phase Photografting of Maleic anhydride on Polymer Films", J. Polymer Sci., Polymer Letters Ed., 21, 367–372, 1983.

Ogiwara et al., "Effect of Solvent on Vapor Phase Photografting of Acrylic Acid on Polymer films", J. Polymer Sci., Polymer Letters Ed., 20, 17–21, 1982.

Pappas, S. P., in UV Curing: Science and Technology, ed. S. P. Pappas, Technology Marketing Corp., Connecticut 1978.

Oster, G., and Shibata, O., "Graft Copolymer of Polyacrylamide and Natural Rubber Produced by Means of Ultraviolet Light", J. Polymer Sci., 26, 233, 1957.

Davis, N. and Garnett, J., "Comparison of Photosensitized and Gamma-Ray-Induced Graft Copolymerization of Monomers to Cellulose", J. Polymer Science Symposium, 55, 287–301, 1976.

Chapiro, A., "Synthese des copolymeres greffes a partir des polymeres ayant subi l'action des radiations ionisantes. II. Influences des conditions de conditions de preirradiation sur la cinetique du greffage sur le polyehtylene", J. Polymer Science, 34, 439, 1959.

Brewis, D. M., and Briggs, D., "Adhesion to polyethylene and polypropylene", Polymer, 22, 7, 1981.

Ballantine, D., Glines, A., Adler, G., and Metz, D. J., "Graft Copolymerization by Pre-Irradiation Technique", J. Polymer Sci., 34, 419, 1959.

Miller, A. A., Lawton, E. J., and Balwit, J. S., "The Radiation Chemistry of Hydrocarbon Polymers: Polyethylene, Polymethylene and Octacosane", J. Phys. Chem., 60, 599, 1956.

Hoffman, A. S., Gilliland, G. R., Merrill, E. W. and Stockmayer, W. H., "Irradiation Grafting of Styrene to High Pressure and Low Pressure Polyethylene Films", J. Polymer Sci., 34, 461, 1959.

Yamakita, H. and Hayakawa, K., "alternating Copolymer Grafting Onto Polymer Films by a Vapor-Phase Grafting Technique", J. Polymer Sci., Polymer Edition, vol. 10, 823–828, 1972.

Burchill, P. J., Pinkerton, D. M. and Stacewicz, R. H., "Polymer Photostabilization by Surface Grafting", J. Polymer Sci. Symposium, 55, 303, 1976.

Briggs, D. in "Surface Analysis and Pretreatment of Plastics and Metals", Chapter 9, Applies Science Publishers, London, 1986.

Burchill, P. J. and Pinkerton, D. M., "Polymer Photostabilization by Surface Grafting", J. Polymer Sci., Symposium No. 55, 186–193, 1976.

Drzal, L. T., Rich, M. J. and Lloyd, P. F., "Adhesion of Graphite Fibers to Epoxy Matrices: I. The Role of Fiber Surface Treatment", J. Adhseion, 16, 1, 133, 1982.

Drzal, L. T., Rich, M. J. and Lloyd, P. F., "Adhesion of Graphite Fibers to Epoxy Matrices: II. The Effect of Fiber Finish", J. Adhesion, vol. 16, 133–152, 1983.

TREATMENT OF ULTRAHIGH MOLECULAR WEIGHT POLYOLEFIN TO IMPROVE ADHESION TO A RESIN

This application is a continuation of application Ser. No. 422,481 filed Oct. 17, 1989, now abandoned.

BACKGROUND OF THE INVENTION

1. Field of the Invention

This invention relates to a method and apparatus for treating an ultrahigh molecular weight, high strength polyolefin material, such as fiber, film or tape, to improve its adhesive bond to resin, particularly polymeric matrix resins such as epoxy, vinyl ester, polyester, polyurethane, polyolefin or thermoplastic rubber, which it can reinforce, preferably for composite end use. More particularly, the present invention is a method and apparatus for the continuous photografting of monomers onto polyolefin material to improve its interfacial adhesion to a polymeric matrix resin, and the material so treated.

2. The Prior Art

A composite consists of basically three major elements: the resin matrix, the reinforcement dispersed in the matrix, and the reinforcement-resin matrix interface. Synthetic fibers in staple or filamentary form, and fabrics produced therefrom, are known for polymer reinforcement. Typical of the fibrous reinforcements are glass, polyester, polyamide (nylon and aramid) and polyolefin fibers. Conventional matrix resins include thermoplastics, such as nylon and polyolefins, and thermosetting materials, such as epoxy and unsaturated polyester resins. Since the primary function of the fiber-matrix interface is to transmit stress from the matrix to the reinforcing fibers, the chemical and physical features of the interface are critical to the mechanical properties and end use performance of the composite. The compatibility between the reinforcing fiber and matrix is then a determining factor in the load sharing ability of the composite.

Polyolefin fibers are highly attractive reinforcing materials due to their low specific gravity, low raw material cost and good chemical resistance. It is known to prepare fibers on the basis of solutions of ultrahigh molecular weight polyolefins, particularly polyethylene, see U.S. Pat. No. 4,344,908, 4,411,854, 4,413,110, 4,422,993, 4,430,383, 4,436,689 and 4,551,296, all hereby incorporated by reference. However, polymeric matrix composites reinforced with these fibers suffer from poor fiber to resin adhesion.

U.S. Pat. No. 4,410,586, hereby incorporated by reference, discloses a method of producing a composite material in which a reinforcing polyolefin material is embedded in thermosetting or thermoplastic matrix material. The highly oriented polyolefin material, preferably a fiber or film having a draw ratio of at least 12:1, is treated prior to incorporation in the matrix by exposing its surface to a plasma discharge, preferably after etching with chromic acid. However, the degree of adhesion to resin for plasma treated fiber gradually reduces with time.

U.S. Pat. No. 2,999,056, hereby incorporated by reference, teaches the irradiation bonding of an unsaturated organic acid to a polymer substrate to enhance melt resistance. And ultraviolet irradiation has been shown, in batch studies, to induce graft copolymerization of monomers to polyethylene film.

The prior art fails, however, to teach the continuous, in line treatment of a polyolefin material to improve its compatibility with a resin which it reinforces, to thereby enhance the reinforced composite properties.

SUMMARY OF THE INVENTION

This invention is a continuous method of treating an ultrahigh molecular weight, high strength polyolefin to improve its adhesive bond to a resin, comprising:

a. soaking the polyolefin in a first solution, comprising a first solvent and a photosensitizer, preferably at least about 10 weight percent of the photosensitizer based on the weight of the first solvent, until the photosensitizer diffuses into the surface of the polyolefin;

b. removing any excess first solvent, preferably by washing the soaked polyolefin in a second solvent which differs from the first solvent;

c. coating the surface of the polyolefin with a second solution comprising (i) about 15 to 70, preferably about 21.26 to 44.76, weight percent of the monomer, (ii) about 0.25 to 5, preferably about 0.58 to 2, weight percent of the photosensitizer, and (iii) about 25 to 84.75, preferably about 53.9 to 76.8, weight percent of the third solvent;

d. exposing the coated polyolefin to a sufficient amount of irradiation, preferably ultraviolet, to surface graft the monomer of the second solution to the polyolefin;

e. washing the treated polyolefin to remove any material other than the surface grafted species; and f. drying the treated polyolefin for suitable packaging. Subsequently, the customer incorporates the treated polyolefin into a resin.

The polyolefin preferably is soaked in the first solution at a temperature of at least about 20° C., preferably about 20° to 50° C., more preferably about 40° to 50° C., most preferably 50° C., for from about 5 seconds up to 24 hours, preferably for about 2.5 to 30 minutes, more preferably for about 2.5 to 25 minutes, and most preferably for 7.5 minutes. For film or tape, it is most preferred to soak for from 5 seconds to 10 minutes at about 60° to 80° C.

It is also preferred that the first solution further comprises a monomer, which is preferably the same as that of the second solution.

The preferred polyolefin is polyethylene, and the preferred form is a shaped article such as a fiber, film or tape, biaxially oriented or otherwise, most preferably fiber. By fiber is meant an elongate body, the length dimension of which is much greater than the transverse dimensions of width and thickness. Accordingly, the term fiber includes monofilament, multifilament, ribbon, strip, staple and other forms of chopped or cut fiber and the like having regular or irregular cross-sections.

The ultrahigh molecular weight, high strength, highly oriented polyethylene fiber preferred in the present method is a filament, obtained by gel spinning a solution of linear polyethylene, with a weight average molecular weight higher than 150,000, preferably at least one million and more preferably between two million and five million. As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 weight percent of one or more polymeric additives such as, alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, and the like which are commonly incorporated by reference. The tenacity of the filaments should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel filament processes. The fiber used may also be based on a highly oriented polypropylene or ethylene-propylene copolymer.

As polymeric matrix generally any polar polymeric material can be used, such as epoxy, phenolic, vinyl ester (preferably unsaturated), polyester (preferably unsaturated), polyurethane, polyolefin (polyethylene, polypropylene preferred), acrylate, cyanoacrylate and polymethymethacrylate resins, polyamide materials, any combinations thereof, and systems that form interpenetrating polymer networks. Thermoplastic rubber such as styrene-butadiene copolymer may also be used. The preferred matrix resin is an epoxy, vinyl ester, polyester, polyurethane, polyolefin or thermoplastic rubber.

The preferred end use for the treated polyolefinic shaped article, in the form of fiber, film or tape, is as reinforcement for a resin which is the matrix portion of a composite, or as fabrics and windings which are impregnated. A general survey of techniques customary in this connection is given in "Handbook of Composites" by Lubin, G., published 1982 with Van. Nostrand Reinhold Company (New York).

The first solvent must swell the polyolefin material's surface to permit diffusion of the photosensitizer (and monomer, preferably) in the soaking step of the method of this invention. The first solvent is thus selected from the group consisting of the benzene derivatives, preferably xylene or toluene, more preferably the former; the alkyl halides, preferably the alkyl chlorides, more preferably carbon tetrachloride; and the cyclic alkanes, preferably decalin.

The second solvent can be any solvent that will remove the first solvent prior to irradiation treatment without interfering unfavorably with the irradiation step of the method of this invention. A volatile second solvent is preferred, i.e., one which will evaporate prior to irradiation. The third solvent, which may be the same or different from the second solvent, also must not interfere unfavorably with the irradiation step of the method of this invention. Thus, a volatile third solvent is also preferred. The second and third solvents can thus be independently selected from the group consisting of low boiling point alcohols, preferably methanol or ethanol, and low boiling point ketones, preferably acetone or methyl ethyl ketone; the ketones are preferred to the alcohols, with acetone being the most preferred ketone. By low boiling point alcohol or ketone is meant an alcohol or ketone having a boiling point of less than about 100° C.

The photosensitizers used in the present invention are chosen from the aromatic ketones, especially the diaryl ketones. Examples include benzophenone and anthraquinone, with benzophenone being preferred.

The monomer used in this invention may be selected from the group consisting of unsaturated organic acids, preferably acrylic acid; unsaturated organosulfonic acids, preferably 2 acrylamido-2methylpropane sulfonic acid; and vinyl monomers, preferably styrene, vinyl acetate, methyl acrylate, methyl methacrylate, acrylamide and acrylonitrile.

Ultraviolet irradiation is preferred although gamma irradiation has been shown in the literature to be acceptable. With ultraviolet irradiation, acceptable total ultraviolet energy ranges from about 1875 to 75,000 joules, preferably about 3750 to 18,000 joules, more preferably about 5000 to 7500 joules, and most preferably about 5625 joules. The purpose is to improve the adhesive bond of the polyolefin to the resin in the composite, preferably without sacrificing properties of the polyolefin, such as the tensile strength of the preferred polyolefin fiber.

The apparatus of the present invention is for the continuous treatment of ultrahigh molecular weight, high strength polyolefin, to improve adhesive bonding thereof to a resin, and comprises:

a. means for feeding the polyolefin to b means for soaking said polyolefin in a first solution as described above until the photosensitizer diffuses into the surface of the polyolefin, followed by c. means for removing any excess first solvent from the soaked polyolefin, followed by d. means for coating the surface of the polyolefin with a monomer, a photosensitizer and a solvent, as described above, followed by e. means for exposing the coated polyolefin to a sufficient amount of irradiation to surface graft the monomer to the polyolefin, followed by f. means for removing any material other than the treated polyolefin, followed by g. drying means, and h. means for taking up the treated polyolefin.

It is preferred that the means for exposing the coated polyolefin to irradiation comprises a chamber, a source of irradiation, a first tube and a cooling jacket for the first tube. The chamber has an inlet and an outlet for passage of the polyolefin. The source of irradiation is located within the chamber. The first tube, through which the polyolefin passes for exposure to the irradiation, is connected at one end to the chamber inlet and at its other end to the chamber outlet. The cooling jacket, which preferably comprises a second tube concentric with and larger than the first tube and a cooling medium therebetween, simultaneously cools the tube and transmits irradiation therethrough. It is preferred that the first and second tubes be made of glass or quartz, preferably quartz. The cooling medium is preferably continuously supplied from a source outside of the chamber; the preferred cooling medium is a liquid, more preferably water. A second cooling medium, preferably a gas, most preferably nitrogen, may be supplied to the outlet of the chamber for flow through the first tube counter to the passage therethrough of the polyolefin, the cooling medium exiting the first tube at the inlet. Aside from using this gas for heat transfer, monomer vapor could be included with the gas for the purpose of increasing the available monomer for grafting and thus enhance the grafting reaction.

The present invention is also apparatus for the treatment of a material with irradiation as described above.

Polyethylene fibers treated in accordance with the method and apparatus of this invention show a great improvement in interfacial adhesion to a matrix resin over untreated polyethylene fibers. See Comparative Example 68.

DESCRIPTION OF PREFERRED EMBODIMENTS

Figure 1:
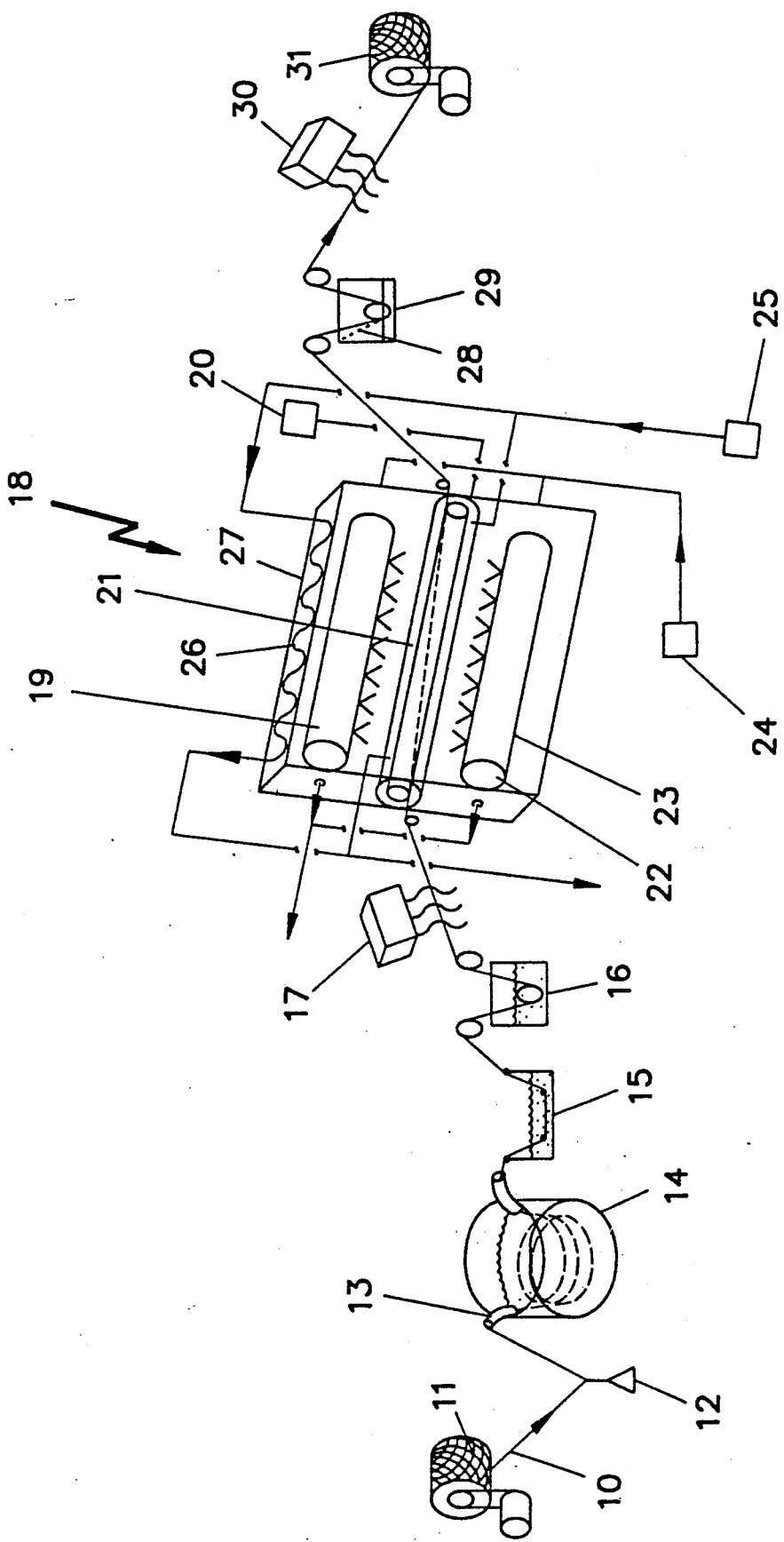
FIG. 1 is a flow diagram of the method and apparatus of the present invention.

The preferred method and apparatus of the present invention will be described with reference to FIG. 1. Although the apparatus is described with reference to fiber, it will be appreciated that with minor adaptations, film or tape could be similarly processed.

Untreated fiber 10 is removed from package 11 and is passed through a coiled tube 13, which contains a solution of monomer, photosensitizer and first solvent, to soak fiber 10. The purpose of soaking is to diffuse the photosensitizer and monomer into fiber 10. The choice of the first solvent is critical. To have good diffusibility the first solvent has to be a relatively strong solvent so as to solvate (swell) the fiber. However, too strong a solvent might lead to damage to the fiber crystallinity. Residence time of fiber 10 in tube 13 (the soaking step) is governed by the fiber speed and the length of tube 13. Temperature control is provided by immersing tube 13 in heated water bath 14. Tension controller 12 provides the necessary pretensioning prior to the soaking step.

After soaking, fiber 10 is passed through wash 15 containing a second solvent to remove any excess first solvent from the soaking step.

After wash 15, fiber 10 is passed through bath 16 (the second solution), containing monomer and photosensitizer dissolved in a third solvent, at ambient temperature.

After bath 16, fiber 10 may optionally be dried by drier 17 to remove any remaining second or third solvent. Fiber 10 then passes through ultraviolet (hereafter UV) irradiation chamber 18. Chamber 18 houses a central quartz tube 19 coextensive in length therewith and through which fiber 10 passes. A counterflow of nitrogen from source 20 is provided through central quartz tube 19 to cool fiber 10 directly and to partially eliminate oxygen from tube 19. The nitrogen exits central quartz tube 19 at its yarn inlet end. A second quartz tube 21, concentric with and larger than central quartz tube 19, is provided, and the space therebetween is filled with circulating or flowing water from source 25 to provide a water jacket around tube 19 for infra-red radiation absorption and heat removal. UV lamps 22 (partially shown) are positioned on opposing sides of quartz tube 21 with parabolic reflectors 23 located adjacent thereto for focusing the radiation from the lamps 22 on fiber 10 passing through tube 19. The path of fiber 10 through tube 19 is along one of the focal points of reflectors 23. A forced air system with air from source 24 supplies cooling air to chamber 18 to remove heat from lamps 22, and cold tap water is piped from source 25 through copper tubing 26 to remove heat from near the walls 27 of chamber 18.

Following exposure to UV irradiation, fiber 10 is left with a coat of surface grafted material, free homopolymer, remaining unused monomer and remaining photosensitizer. The loose material is removed from fiber 10 by spraying with hot tap water 28 at bath 29, followed by two washings with a solvent (unshown). Both water and solvent washing are deemed necessary. The photosensitizer is not soluble in water but readily soluble in a solvent such as acetone The reverse is true with the homopolymer. An alternative approach would be to wash the fibers in a hot mixture of water and a solvent such as acetone. Removal of the remaining photosensitizer is important as the sensitizer would degrade both the fiber and the resin material upon exposure to natural sources of UV light.

Fiber 10 is then dried This drying may occur by allowing natural evaporation of excess solvent from bath 29 or by drying at drier 30, followed by some form of takeup at 23. Fiber 10 is then ready for incorporation into a composite laminate.

The samples were prepared and tested in accordance with the procedures which immediately follow.

A. Sample Fabrication for Testing

1. Single Fiber Tensile Samples

Each end of a fiber was wrapped three to four times around a tab that had double sided adhesive tape on one face. These tabs were separated across a measured distance of 18.4 centimeters to provide a constant gauge length. A second tab, also with adhesive tape, was placed against the first In this manner, the two tabs sandwiched the wraps of fiber between adhesive tape. The tabs were then compressed in a vice and the samples were ready for testing.

2. Pullout Samples

Resin is added to a silicone mold which has a maximum of eleven fibers in place for embedding in the resin. One end of each fiber was tabbed as described above for fabrication of single fiber tensile samples. Once gelation occurs, the unit is placed in an oven for curing according to instructions by the resin manufacturer.

3 Laminate Fabrication

Unidirectional laminates were made for interlaminar shear strength (hereafter ILSS) testing. A dry fiber tow was wrapped onto backing paper and resin was applied by brush to the surface. Excess resin was removed while still on the drum. The wet ply was then cut into sections and stacked into the desired laminate configuration. For the cure cycle, the bump cycle method was used. The bump cycle is a process whereby laminates are heated under a set pressure and temperature, and then the pressure is suddenly brought down to atmospheric by rapidly opening the press. The internal pressure of the gases in the laminate at the cure temperature is now far larger than ambient. The resin immediately outgasses. If the bump cycle is repeated a sufficient number of times, outgassing is complete, without excessive resin flow.

Temperatures of 50° to 60° C. and pressures of up to 100 psi were used. The panels were then removed and rewrapped with new bleeder and breather cloths as necessary, vacuum bagged using 0.05 MPa vacuum and autoclave cured at 60° C. and 0.343 MPa.

B. Test Methods.

1. Single Fiber Tensile Test

Tensile testing was performed according to ASTM D-3379, using an Instron Type A Load Cell of 500 gram full scale, except as follows: sample tabbing was as described above; fiber length used was about 180 mm; and the fiber diameter was taken as 0.027 mm. The deflections were determined by correlating the crosshead and chart speeds and were independently checked with a linear deflection transducer. The tensile test was considered a preliminary screening test for identifying potential large drops of tensile properties

2. Single Fiber Pullout Test

The tests were carried out in an Instron machine, with a crosshead speed of 1.27 cm/min. The load required to debond and pull the fibre through was measured.

3. Interlaminar Shear Strength (ILSS) Test

ILSS tests were conducted on 8 to 11 samples of each treatment type, in accordance with ASTM D-2344 Panels produced in Examples 18–20, 36, 43–48, 50–58, and 64–65 were 16 to 20 plies thick, leading to a measured thickness of 1.5 to 2.2 mm. For ILSS testing, the span to depth ratio was set at 5:1. In the other examples, the span to depth ratio was 4:1, with a minimum panel thickness of about 2.6 mm.

Presented below are examples of the present invention as well as comparative examples.

In the examples, unless specified otherwise, the polyolefin shaped materials used were ultrahigh molecular weight, high strength polyethylene fibers (commercially available from Allied Corporation as SPECTRA® 1000). The resin used was an epoxy (commercially available as Shell Epon 828) which was cured with tris-(dimethylaminomethyl)phenol (commercially available hardener, Ancamine K54). The monomer was a hydroquinone monomethyl ether inhibited acrylic acid and was distilled to remove the inhibitor prior to use. The photosensitizer was 99+% pure benzophenone. The xylene, carbon tetrachloride, and acetone that were used as first and second solvents in the soaking and fiber washing steps, were 99% pure. The acetone that was used as the third solvent in the coating step prior to UV treatment was analytical reagent grade. Whenever water was used in a solution, it was distilled and deionized first. The equipment utilized was as described above with reference to FIG. 1, unless otherwise stated. Temperature control at the soaking step was provided by heated water bath. 14. Water temperature was controlled to ±1° C. The solution temperature in tube 13 was periodically checked and found to agree closely with the bath temperature. The soak solution quantity was checked regularly during a run and fresh solution added to keep the level constant. Wash 15 (second solvent—acetone) was changed at the end of each run due to contamination from the first solvent (xylene). The coating (dip) solution was at ambient temperature. All contact surfaces in the process line were either ceramic or incorporated Teflon. Two high intensity, medium pressure, mercury vapor lamps supplied by Conrad-Hanovia were selected as the ultraviolet light source 22. Other acceptable sources are, e.g., low pressure mercury vapor lamps, commonly known as germicidal lamps, radio frequency energized or electrodeless lamps and xenon filled flash tubes. Reflectors 23 were designed to maintain a temperature in the range 600°–800° C., with a seal temperature of 250° C. The hot water spray wash 28 was at approximately 45° C.

EXAMPLES 1–10

In Examples 1 through 10, the soak solution residence times and temperatures in tube 13 were varied as shown in Table 1. The soak solution comprised: about 52.43 weight percent acrylic acid, about 4.33 weight percent benzophenone, and about 43.25 weight percent xylene. Fibers were removed after the soak step and tested for the fiber tensile property of breaking load (g) pursuant to ASTM D3379. The results are presented in Table 1. At 40° C., there was no significant loss in fiber tensile properties. However, a definite decrease in strength occurs after 10 and 20 minutes soaking times at 50° C. At even longer soaking times, the reduction becomes substantial for strength (15–20%). From this data, it can be seen that it is desirable to keep the soaking temperature at or below about 50° C., for these residence times. It is believed, however, that a high temperature, short duration soak step would be feasible.

EXAMPLES 11–17

In Examples 11 through 17, the total UV energy to which an untreated fiber (no soaking or coating) was exposed was varied, as shown in Table 2. After UV irradiation, the fibers were removed for testing. Measured fiber tensile strengths are presented in Table 2. Note that the data presented are based on the total exposed energy, as this allows different power settings and exposure times to be compared From this data it is apparent that the tensile strength decreases with increasing UV energy. The higher tensile strength values (lower total UV energy) are preferred in composite applications, although there may be other applications where the lower tensile strength values (higher total UV energy) are preferred.

EXAMPLES 18–29

A single, independent soak step at 50° C. was performed for 7.5 minutes on a spool of fibers. These fibers were subsequently coated in one of three monomer/solvent solutions (35 ml/120 ml or 65 ml/120 ml or 75 ml/120 ml acrylic acid/acetone, all with 2.5 % benzophenone by weight of solvent—1.77, 1.43 and 1.35 weight percent benzophenone of the total solution, respectively), and exposed for 15 seconds to ultraviolet radiation (49 W/cm). The fibers were then further exposed in 15 second increments with coating in between exposures. Panels were made from fiber taken between passes in each of Examples 18, 19, 21, 23, 24, 27 and 28. In Example 20, the fiber was exposed for 30 seconds, single pass, and in each of Examples 22, 25, 26 and 29, the fiber was exposed for 45 seconds, single pass. Panels were made from these examples also. The results of the ILSS tests on these panels are presented in Table 3.

The data indicate that multiple pass treatment was better than the single pass treatment at lower concentrations of acrylic acid in the coating solution (35 ml/120 ml), but at the higher concentrations (65 ml/120 ml or 75 ml/120 ml) the single pass treatment was better than the multiple pass treatment.

EXAMPLES 30-35

In this set of examples, the soaking solution (as in Examples 1-10) was maintained at a temperature of 50° C., and the fiber was soaked for 7.5 minutes. UV exposure was for 0.75 second to 49 W/cm (125 W/in). The coating solution comprised 65 ml acrylic acid monomer and 120 ml acetone (solvent). The concentration of sensitizer in the coating solution was varied in this set of examples from 1 to 3.5% based on the weight of the solvent. Data are listed in Table 4. An increase in the photosensitizer concentration up to 2.5% based on the weight of the solvent resulted in increases in ILSS, but further increases led to a decrease in ILSS. Only the results at 2% (based on the weight of the solvent) concentration (Example 32) were anomalous

EXAMPLES 36-42

In this set of examples, the soaking solution (as in Examples 1-10) was maintained at a temperature of 50° C., and the fiber was soaked for 7.5 minutes. UV exposure was for 0.75 second to 49 W/cm (125 W/in). The sensitizer concentration in the coating solution prior to UV treatment was maintained at 2.5 % by weight of the solvent. The solvent, acetone, was maintained at a level of 120 ml. The monomer concentration in the coating solution was varied from 25 ml up to 75 ml to see if there would be any effect on the ILSS values. Data are presented in Table 5.

With reference to Table 5, it can be seen that as the monomer concentration in the coating solution was increased beyond 25 ml, the ILSS increases, up to a maximum of 36.0 MPa at 65 ml, and thereafter decreases.

EXAMPLES 43-58

The effect of the soaking step was examined in Examples 43-58, wherein the soak solution was as in Examples 1-10 and the coating solution was 35 ml/120 ml of acrylic acid in acetone, with 2.5% benzophenone on weight of solvent. The span to depth ratio utilized was 5:1 except for Example 49, which utilized a ratio of 4:1. UV exposures to 49 W/cm were for the times listed in Table 6. The soaking times, where applicable, were for ten times the number of minutes (or fraction of a minute) for UV exposure ILSS data are presented in Table 6. The trend was toward much improved ILSS values with the soaking step.

EXAMPLES 59-63

In this set of examples the soaking step was modified. The fiber was coated with 4% benzophenone in acetone, followed by coating with a solution comprising 2-acrylamido-2-methylpropane sulfonic acid and water in the concentrations shown in Table 7, plus 0.23% polyvinyl acetate of total solution. The fibers were then exposed to UV radiation at 49 W/cm (125 W/in) for varying time periods. Panels were made from these fibers for testing, and data are also presented in Table 7.

The highest value of ILSS attained belonged to Example 59 (25.9 MPa). It is expected that ILSS values with magnitudes of 31 to 35 MPa would be attainable with this monomer if the fibers were soaked prior to coating as in Examples 43-58 above Similar results would be expected using the other monomers mentioned previously as acceptable.

EXAMPLES 64-65

In Example 64, the fiber was soaked at a temperature of 50 C. in the solution of Examples 1-10 for 7.5 minutes. The coating solution was 35 ml/120 ml of acrylic acid in acetone, with 2.5% benzophenone on weight of solvent. The fiber was then exposed to UV treatment (49 W/cm) for 0.75 minute. The span to depth ratio utilized was 5:1. ILSS value obtained was 29.3 MPa.

Example 65 was identical to Example 64 except that dry breathing grade air was utilized instead of nitrogen. An ILSS value of 29.5 MPa was obtained, which compares favorably with Example 64.

EXAMPLES 66-67
Comparative

In these two examples, the fiber was irradiated while in contact (being coated) with the acrylic acid solution. The flow of graft solution was provided to the central quartz tube of the UV irradiation chamber. A fully submersible pump providing a maximum flow of about 3 liters per minute was used to pump the solution. The solution travelled concurrently with the fibers down the tube and was collected in a glass pot. The pump was housed in this collection vessel and was protected by a copper screen from build-up of homopolymerized material. Manual flow control was provided with an in-line valve.

In Example 66, the untreated fiber was passed through a 3:1 molar ratio of xylene/benzophenone with a residence time of 20 minutes, at a temperature of 50 C. The fiber was then washed in acetone, and passed through a 2.5 mole % solution of benzophenone in acetone. Following this, the fiber was passed through the UV treatment chamber. The fiber was simultaneously exposed to a 10 mole % acrylic acid solution in water. The fiber was then washed in warm water, resoaked in 50 % water for 1 and ½ hours, acetone rinsed and dried.

Example 67 was the same as Example 66 above, except that the solution was reduced to 5 mole % acrylic acid solution in water.

In both examples homopolymerization occurred along the irradiation tube, and treatment had to be terminated.

EXAMPLE 68
Comparative

A panel was formed utilizing untreated fiber (Spectra 1000). The ILSS value obtained was 10.3 MPa, which is significantly lower than values obtained using fiber from present invention.

TABLE 1

Effect of Soaking Time and Temperature on Breaking Load Measured at Room Temperature

| Example | Soak Time (min) | Treatment Temperature | Breaking Load (g)* |
|---|---|---|---|
| 1 | 0 | 50° C. | 216 (17) |
| 2 | 1 | 50° C. | 207 (19) |
| 3 | 5 | 50° C. | 209 (17) |
| 4 | 10 | 50° C. | 181 (38) |
| 5 | 20 | 50° C. | 176 (37) |
| 6 | 0 | 40° C. | 216 (17) |
| 7 | 1 | 40° C. | 216 (16) |
| 8 | 5 | 40° C. | 198 (23) |
| 9 | 10 | 40° C. | 203 (20) |

TABLE 1-continued

Effect of Soaking Time and Temperature on
Breaking Load Measured at Room Temperature

| Example | Soak Time (min) | Treatment Temperature | Breaking Load (g)* |
|---|---|---|---|
| 10 | 20 | 40° C. | 230 (18) |

*Standard Deviation Noted Parenthetically

TABLE 2

Tensile Strength of UV Treated Fiber

| Example | UV Energy (joules) | Tensile Strength of Fiber (g) |
|---|---|---|
| 11 | 0 | 208.3 ± 30.4 |
| 12 | 7500 | 205.6 ± 12.0 |
| 13 | 18000 | 174.0 ± 21.0 |
| 14 | 22500 | 127.0 ± 27.3 |
| 15 | 37500 | 129.5 ± 9.0 |
| 16 | 54000 | 88.0 ± 6.5 |
| 17 | 75000 | 67.4 ± 15.1 |

TABLE 3

Comparison Between Multiple Pass and Single Pass UV Treatments

| Example | Coating Solution (Weight Percent) Monomer/Solvent/Sensitizer | Time (min) | # of Passes | ILSS (MPa) |
|---|---|---|---|---|
| 18* | 27.44/70.79/1.77 | 0.25 | 1 | 26.1 ± 0.5 |
| 19* | " | 0.25 | 2 | 30.6 ± 0.6 |
| 20* | " | 0.5 | 1 | 26.4 ± 0.6 |
| 21 | " | 0.25 | 3 | 34.1 ± 0.8 |
| 22 | " | 0.75 | 1 | 33.0 ± 0.8 |
| 23 | 41.25/57.32/1.43 | 0.25 | 3 | 25.2 ± 0.9 |
| 24 | " | 0.25 | 3 | 23.8 ± 0.5 |
| 25 | " | 0.75 | 1 | 32.1 ± 0.9 |
| 26 | " | 0.75 | 1 | 36.0 ± 0.8 |
| 27** | 44.76/53.90/1.35 | 0.25 | 2 | 24.8 ± 0.8 |
| 28** | " | 0.25 | 3 | 25.1 ± 0.9 |
| 29** | " | 0.75 | 1 | 31.9 ± 0.6 |

*ILSS span to depth ratio was 5:1. All other examples, 4:1.
**No acrylic acid in soak solution, i.e. xylene + 10% benzophenone by weight of xylene. Soak solution of other examples as in Examples 1-10.

TABLE 4

Effect of Sensitizer Concentration in the Coating Solution on ILSS

| Example | Sensitizer (Weight Percent of) Solvent | Sensitizer (Weight Percent of) Solution | ILSS (MPa) |
|---|---|---|---|
| 30 | 1 | 0.58 | 31.7 |
| 31 | 1.5 | 0.86 | 34.2 |
| 32 | 2 | 1.15 | 28.3 |
| 33* | 2.5 | 1.43 | 36.0 |
| 34 | 3 | 1.71 | 31.7 |
| 35 | 3.5 | 1.99 | 27.2 |

*Same as Example 26.

TABLE 5

Effect of Coating Solution Monomer Concentration on ILSS

| Example | Monomer Concentration (ml) | Coating Solution (Weight Percent) Monomer/Solvent/Sensitizer | ILSS (MPa) |
|---|---|---|---|
| 36* | 25 | 21.26/76.81/1.93 | 23.7 |
| 37** | 35 | 27.44/70.79/1.77 | 33.0 |
| 38 | 45 | 32.71/65.65/1.64 | 34.0 |
| 39 | 55 | 37.27/61.20/1.53 | 35.7 |
| 40*** | 65 | 41.25/57.32/1.43 | 36.0 |
| 41 | 65 | 41.25/57.32/1.43 | 37.6 |
| 42 | 75 | 44.76/53.90/1.35 | 31.4 |

*5:1 span to depth ratio. All others at ratio of 4:1.
**Same as Example 22.
***Same as Examples 26 and 33.

TABLE 6

Effect of Soaking Step

| Example | UV Time (min) | Soak Time (min) | ILSS (MPa) |
|---|---|---|---|
| 43 | 0.25 | 2.5 | 28.9 |
| 44 (Comparative) | 0.25 | 0 | 25.2 |
| 45* | 0.5 | 5 | 31.9 |
| 46 | 0.5 | 5 | 31.4 |
| 47* | 0.5 | 5 | 29.9 |
| 48 (Comparative) | 0.5 | 0 | 26.0 |
| 49** | 1 | 10 | 33.3 |
| 50 | 1 | 10 | 31.0 |
| 51 | 1 | 10 | 31.0 |
| 52 | 1 | 10 | 30.8 |
| 53 (Comparative) | 1 | 0 | 25.5 |
| 54 (Comparative) | 1 | 0 | 34.6 |
| 55 | 1.5 | 15 | 27.7 |
| 56 (Comparative) | 1.5 | 0 | 28.5 |
| 57 | 2 | 20 | 31.9 |
| 58 (Comparative) | 2 | 0 | 26.7 |

*Soaked at 45° C. All others which were soaked were at 50° C.
**Span to depth ratio 4:1. All other examples 5:1.

TABLE 7

Effect of Changing Monomer in Coating Solution on ILSS

| Example | Monomer Concentration (ml/ml)* | UV Exposure (min) | ILSS (MPa) |
|---|---|---|---|
| 59 | 20/100 | 0.75 | 25.9 |
| 60 | 20/100 | 0.25 | 24.5 |
| 61 | 20/100 | 0.25 | 22.9 |
| 62 | 20/100 | 0.50 | 22.1 |
| 63 | 20/100 | 0.75 | 17.4 |

*2-acrylamido-2-methylpropane sulfonic acid/water.

We claim:

1. A continuous method of treating an ultrahigh molecular weight, high strength polyolefin to improve adhesive bonding of the polyolefin to a resin, comprising:

a. soaking said polyolefin in a first solution which comprises a first solvent and an aromatic ketone photosensitizer until the photosensitizer diffuses into the surface of the polyolefin, said first solvent being selected from the group consisting of a benzene derivative, an alkyl halide, and a cyclic alkane;

b. removing any excess first solvent;

c. coating the surface of said polyolefin with a second solution comprising (i) about 15 to 70 weight percent of a monomer selected from the group consisting of an unsaturated organic acid, an unsaturated organosulfonic acid, and a vinyl monomer, (ii) about 0.25 to 5.0 weight percent of an aromatic ketone photosensitizer and (iii) about 25 to 84.75 weight percent of a solvent selected from the group consisting of a low boiling point alcohol and a low boiling point ketone;

d. exposing the coated polyolefin to a sufficient amount of irradiation to surface graft the coating monomer onto said polyolefin;

e. washing the treated polyolefin; and f. drying the treated polyolefin.

2. The method of claim 1 wherein the polyolefin is polyethylene.

3. The method of claim 2 wherein the polyethylene is a shaped article

4. The method of claim 3 wherein the shaped article is selected from the group consisting of fiber, film and tape.

5. The method of claim 2 wherein the resin is selected from the group consisting of epoxy, vinyl ester, polyester, polyurethane, polyolefin and thermoplastic rubber.

6. The method of claim 5 wherein the resin is the matrix portion of a composite.

7. The method of claim 6 wherein the polyethylene is a shaped article selected from the group consisting of fiber, film and tape.

8. The method of claim 2 wherein the coated polyolefin is exposed to ultraviolet irradiation.

9. The method of claim 8 wherein the total ultraviolet energy ranges up to about 75,000 joules.

10. The method of claim 2 wherein said first solvent is xylene.

11. The method of claim 2 wherein said first solvent is carbon tetrachloride.

12. The method of claim 2 wherein said first solvent is decalin.

13. The method of claim 2 wherein the solvent in said second solution is acetone.

14. The method of claim 2 wherein the first solution further comprises a monomer selected from the group consisting of an unsaturated organic acid, an unsaturated organosulfonic acid, and a vinyl monomer.

15. The method of claim 14 wherein the monomer in each of said first and said second solutions is acrylic acid.

16. The method of claim 14 wherein the monomer in each of said first and said second solutions is 2 acrylamido-2-methylpropane sulfonic acid.

17. The method of claim 2 wherein said removing step comprises washing the soaked polyolefin in a second solvent selected from the group consisting of a low boiling point alcohol and a low boiling point ketone.

18. The method of claim 2 wherein the second solution comprises about 21.26 to 44.76 weight percent of the monomer, about 0.58 to 2 weight percent of the photosensitizer, and about 53.9 to 76.8 weight percent of the solvent.

19. The method of claim 2 wherein said polyolefin is soaked in the first solution at a temperature of about 20° to 50° C. for from about 5 seconds up to 24 hours.

20. The method of claim 19 wherein said polyolefin is soaked in the first solution at a temperature of about 40° to 50° C. for from about 2.5 to 30 minutes.

21. The method of claim 1 wherein said polyolefin is polyethylene fiber; said first solution comprises acrylic acid, xylene and benzophenone; said fiber is soaked in said first solution for from about 2.5 to 25 minutes at a temperature of about 40° to 50° C.; said second solution comprises about 21.26 to 44.76 weight percent acrylic acid, about 0.58 to 2 weight percent of benzophenone, and about 53.9 to 76.8 weight percent of acetone; and said coated fiber is exposed to ultraviolet radiation with total ultraviolet energy ranging from about 5000 to 7500 joules.

22. A composite containing a fiber produced by the method of claim 21.

* * * * *